US008046695B2

(12) United States Patent
Ye et al.

(10) Patent No.: US 8,046,695 B2
(45) Date of Patent: Oct. 25, 2011

(54) METHODS AND SYSTEMS FOR INCORPORATING AT LEAST ONE WINDOW FROM A FIRST DESKTOP ENVIRONMENT HAVING A FIRST THEMED GRAPHICAL DISPLAY INTO A SECOND DESKTOP ENVIRONMENT HAVING A SECOND THEMED GRAPHICAL DISPLAY

(75) Inventors: Ning Ye, Boynton Beach, FL (US); Juan Rivera, Doral, FL (US); Julian Petrov, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 981 days.

(21) Appl. No.: 11/941,567

(22) Filed: Nov. 16, 2007

(65) Prior Publication Data

US 2009/0106662 A1 Apr. 23, 2009

Related U.S. Application Data

(60) Provisional application No. 60/981,261, filed on Oct. 19, 2007.

(51) Int. Cl.
G06F 3/00 (2006.01)
(52) U.S. Cl. .................. 715/740; 715/744; 715/781
(58) Field of Classification Search .................. 715/740, 715/733, 735, 738, 742, 744, 746, 747, 781
See application file for complete search history.

(56) References Cited

U.S. PATENT DOCUMENTS

| | | | |
|---|---|---|---|
| 6,462,755 B1 * | 10/2002 | Anthias | 715/733 |
| 6,496,204 B1 * | 12/2002 | Nakamura | 715/781 |
| 6,950,991 B2 | 9/2005 | Bloomfield et al. | |
| 2002/0015042 A1 * | 2/2002 | Robotham et al. | 345/581 |
| 2002/0196279 A1 * | 12/2002 | Bloomfield et al. | 345/749 |
| 2005/0091571 A1 * | 4/2005 | Leichtling | 715/500 |
| 2006/0230105 A1 | 10/2006 | Shappir et al. | |
| 2008/0238929 A1 * | 10/2008 | Abdo et al. | 345/581 |

FOREIGN PATENT DOCUMENTS

WO WO-9963430 12/1999
WO WO-2008121473 10/2008

OTHER PUBLICATIONS

"Vista-eXceed," pp. 1-12, URL http://web.archive.org/web/20060907153237/www.stu.qmul.ac.uk/primer/pdf/exceed.pdf.
International Search Report for PCT/US2008/080299 (Mar. 2009).
Written Opinion for PCT/US2008/080299 (Mar. 2009).

* cited by examiner

*Primary Examiner* — Weilun Lo
*Assistant Examiner* — Rashedul Hassan
(74) *Attorney, Agent, or Firm* — Foley & Lardner LLP; John D. Lanza

(57) ABSTRACT

A system for incorporating at least one window from a first desktop environment having a first themed graphical display into a second desktop environment having a second themed graphical display includes a first virtual channel, a second virtual channel, and a local agent. The first virtual channel conveys graphical data associated with a window in the first desktop environment comprising a client area and a window rectangle. The second virtual channel conveys window attribute data associated with the window and including screen coordinates for the client area. A local agent forms a corresponding window in the second desktop environment, the corresponding window displaying the graphical data received from the first virtual channel in a local client area displayed at screen coordinates in accordance with the received window attribute data, the corresponding window having a local window rectangle displayed according to a second graphical theme.

24 Claims, 7 Drawing Sheets

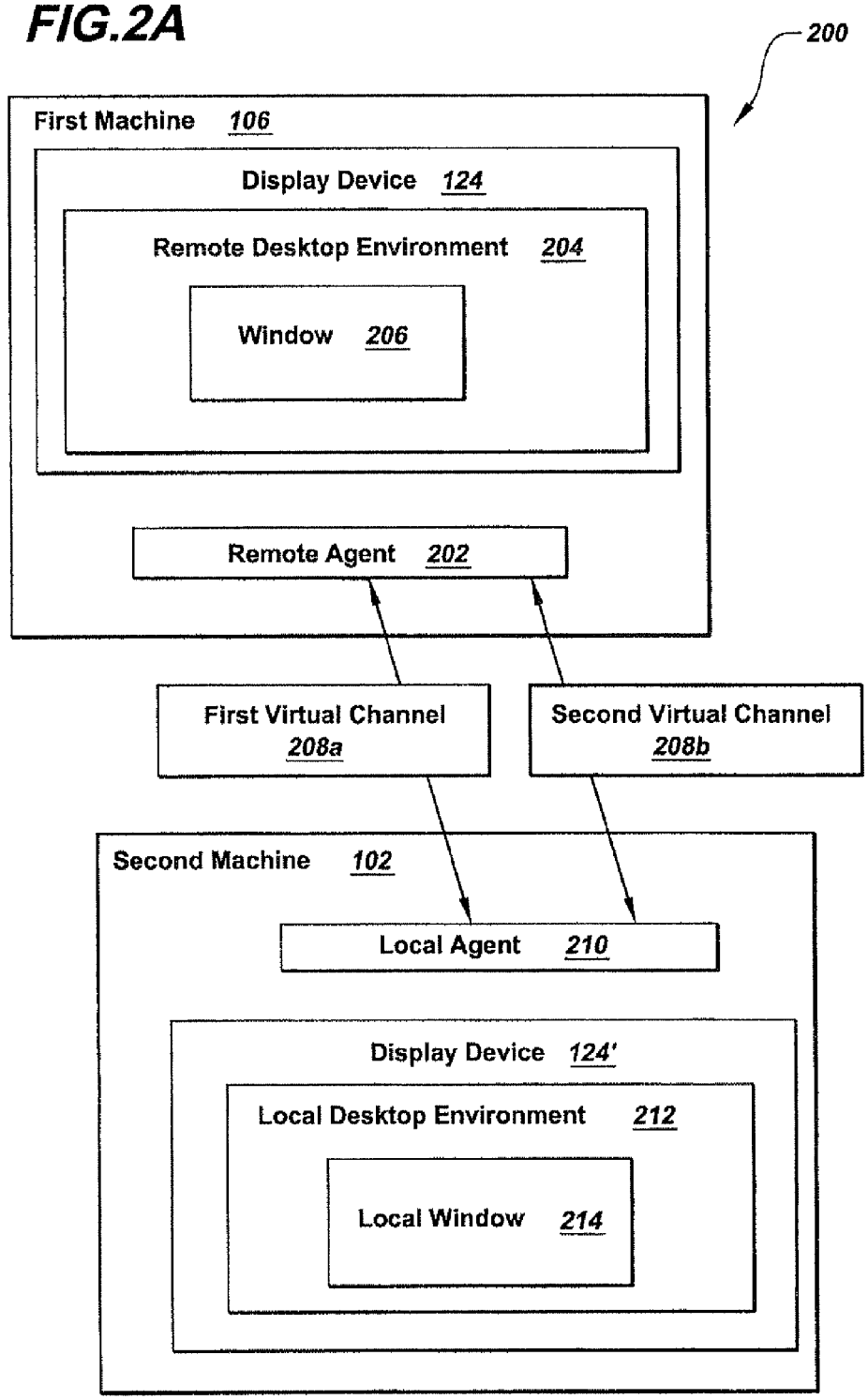

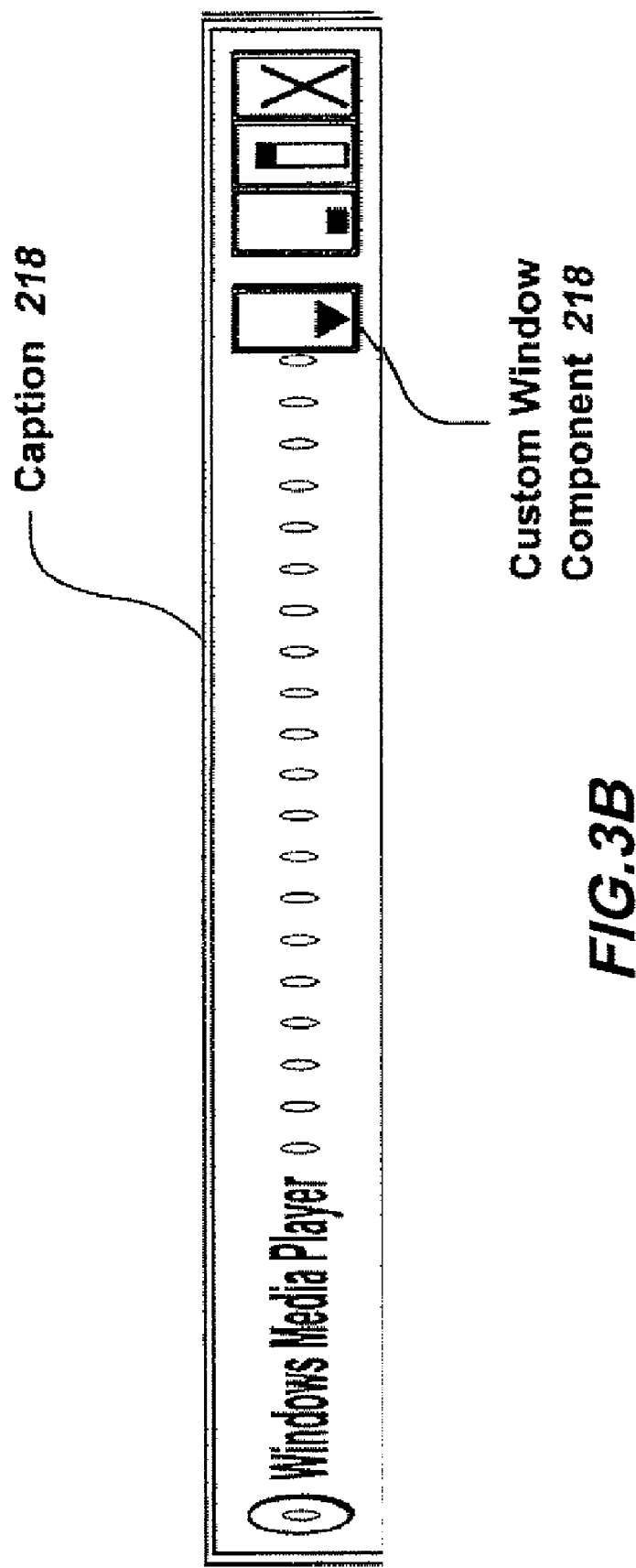

METHODS AND SYSTEMS FOR INCORPORATING AT LEAST ONE WINDOW FROM A FIRST DESKTOP ENVIRONMENT HAVING A FIRST THEMED GRAPHICAL DISPLAY INTO A SECOND DESKTOP ENVIRONMENT HAVING A SECOND THEMED GRAPHICAL DISPLAY

FIELD OF THE INVENTION

The present disclosure relates to methods and systems for incorporating at least one window in one desktop environment into a second desktop environment. In particular, the present disclosure relates to methods and systems for incorporating at least one window from a first desktop environment having a first themed graphical display into a second desktop environment having a second themed graphical display.

BACKGROUND OF THE INVENTION

Seamless window technology allows a user of a client device to view and interact with local versions of remote windows provided by servers. Typically, the local version of the remote window is displayed on the client device according to a graphical theme applied to the remote window on the server. In some environments, the remote window has a theme that is different from a theme of other, local windows displayed by the client device, which results in a local desktop environment displaying local windows according to one theme and local versions of remote windows according to a second theme. This may result in the display of an inconsistent, confusing, aesthetically unpleasant desktop environment for the user.

BRIEF SUMMARY OF THE INVENTION

In one aspect, a method for incorporating at least one remote window from a remote desktop environment having a first themed graphical display into a local desktop environment having a second themed graphical display, includes the step of receiving, via a first virtual channel coupled to a remote desktop environment displayed according to a first graphical theme, graphical data associated with a remote window comprising a client area and a window rectangle. The method includes the step of receiving, via a second virtual channel coupled to the remote desktop environment, window attribute data associated with the remote window and including screen coordinates for the client area. The method also includes the step of forming a corresponding window in a local desktop environment displayed according to a second graphical theme, the corresponding window displaying the graphical data received from the first virtual channel in a local client area, the local client area displayed at screen coordinates in accordance with the window attribute data received from the second virtual channel, the corresponding window having a local window rectangle generated by a local operating system and displayed according to a second graphical theme.

In one embodiment, the method includes the step of receiving, from a remote agent via the second virtual channel, an instruction for directing the formation of the corresponding local window. In another embodiment, the method includes the step of determining, by a remote agent, whether to transmit, to the local agent, the screen coordinates for the client area. In still another embodiment, the method includes the step of transmitting, by the local agent, to a remote agent, window attribute data associated with the client area of the corresponding window.

In another aspect, a system for incorporating at least one remote window from a remote desktop environment having a first themed graphical display into a local desktop environment having a second themed graphical display includes a first virtual channel, a second virtual channel, and a local agent. The first virtual channel, which is coupled to a remote desktop environment, conveys graphical data associated with a remote window. The remote window includes a client area and a window rectangle. The remote desktop environment is displayed according to a first graphical theme. The second virtual channel, which is coupled to the remote desktop environment, conveys window attribute data associated with the remote window. The window attribute data including screen coordinates for the client area. The local agent, which is coupled to the remote desktop environment via the first and second virtual channels, directs the formation of a corresponding local window in a local desktop environment displayed according to a second graphical theme. The corresponding local window includes a local client area that displays the graphical data conveyed by the first virtual channel, which is displayed at screen coordinates within the local desktop environment in accordance with the window attribute data conveyed by the second virtual channel, and has a local window rectangle displayed according to a second graphical theme.

In one embodiment, a first machine generates the remote desktop environment and providing, to a user of a second machine, access to the remote desktop environment. In another embodiment, the local agent executes on the second machine displaying the local desktop environment to a user. In still another embodiment, a remote agent transmits, to a local machine, an instruction for directing the formation of the corresponding local window. In yet another embodiment, a remote agent includes a detection process determining whether to transmit, to the local agent, the screen coordinates for the client area.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2A is a block diagram depicting one embodiment of a system for incorporating at least one remote window from a remote desktop environment having a first themed graphical display into a local desktop environment having a second themed graphical display;

FIG. 3B is a screen shot depicting one embodiment of a caption on a window including a customized window component.

DETAILED DESCRIPTION OF THE INVENTION

Figure 1A:
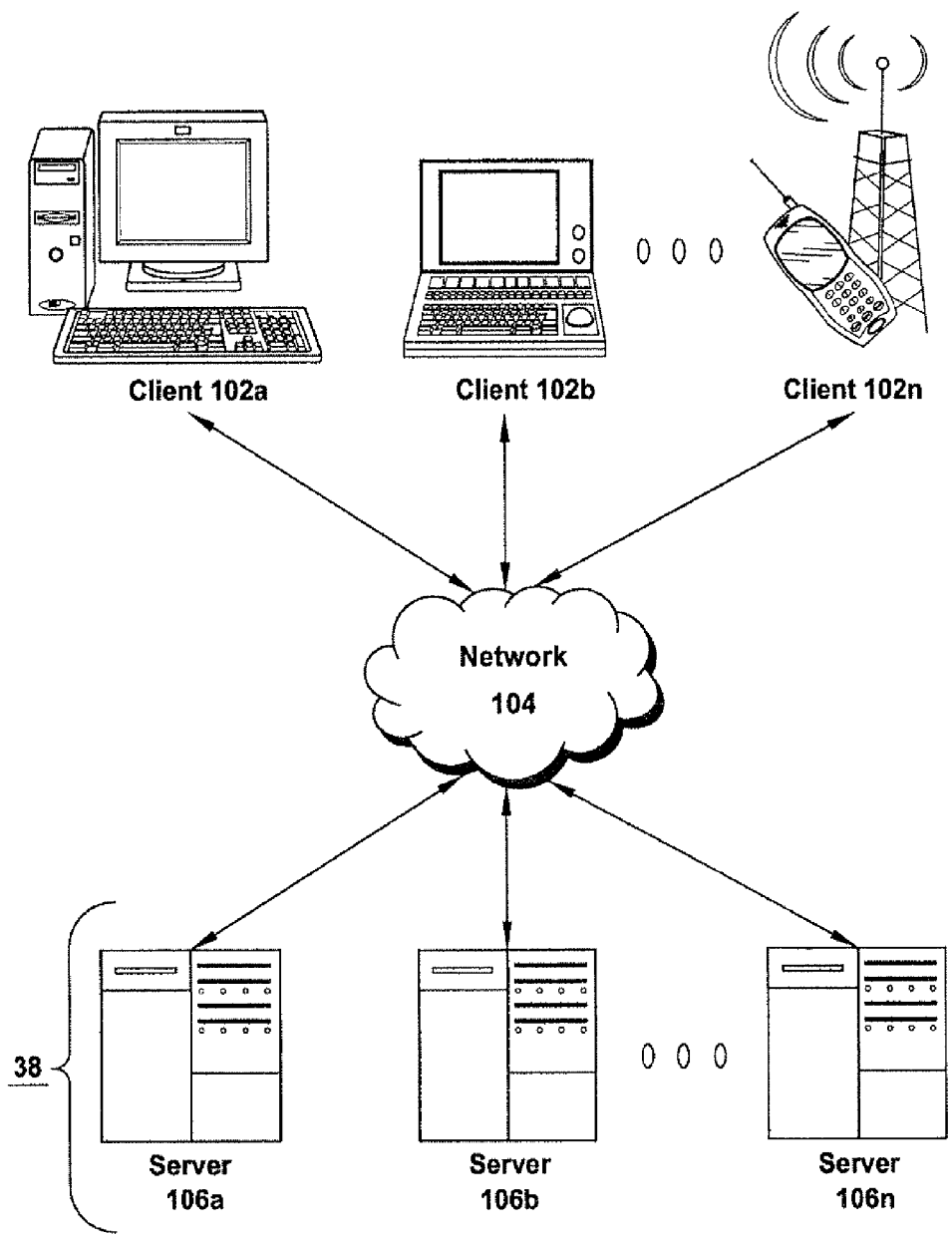
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, client device(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output data of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output data to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
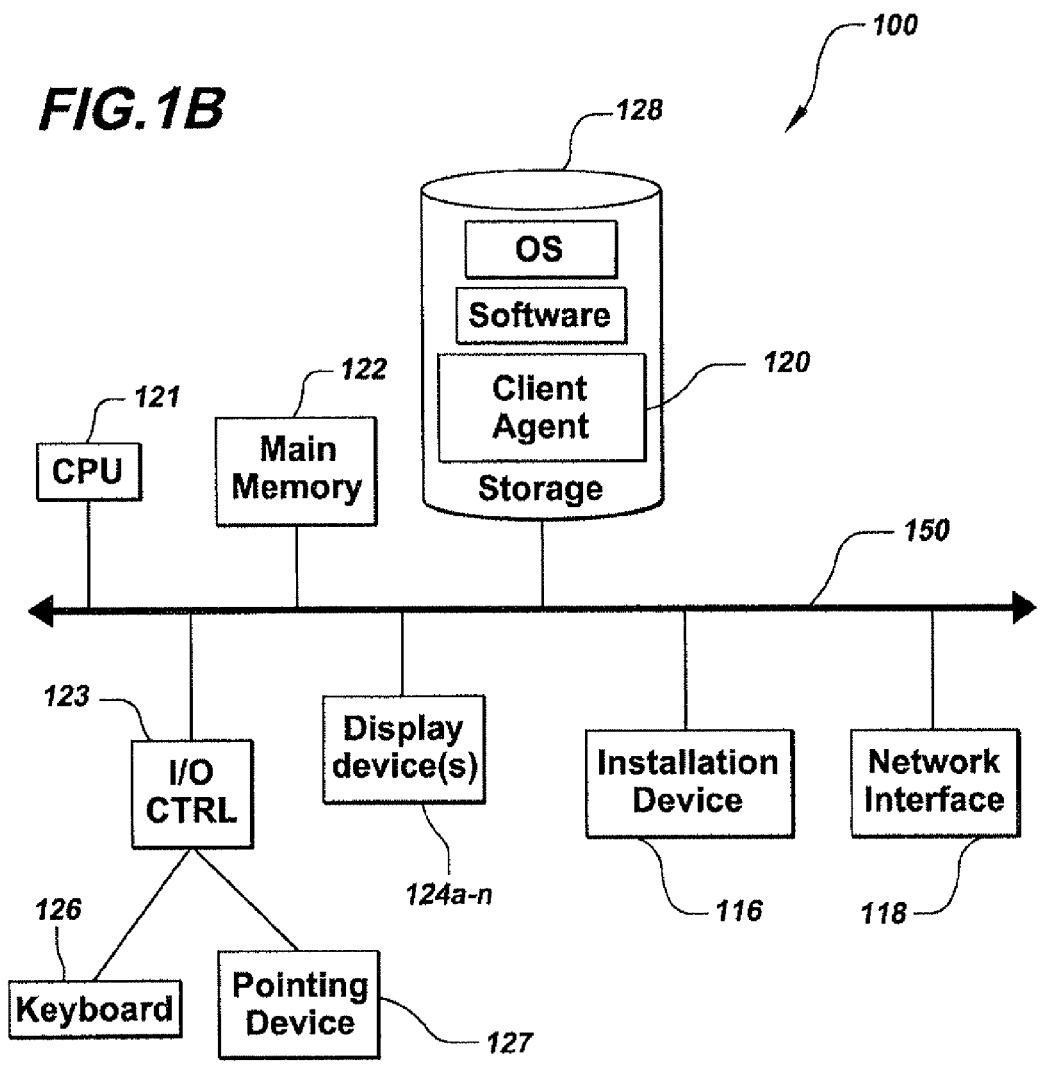
FIGS. 1B and 1C are block diagrams depicting embodiments of computing devices useful in connection with the methods and systems described herein.
Figure 1C:
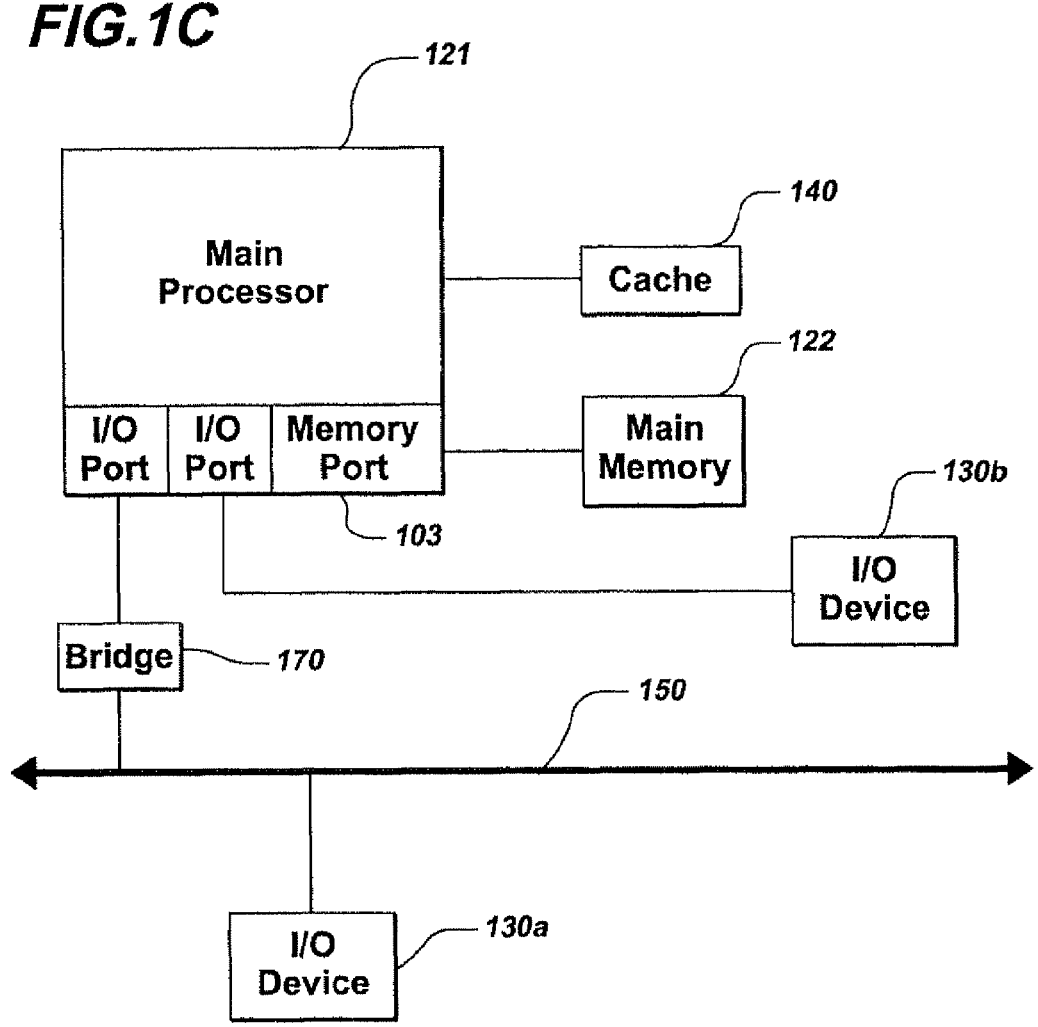

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple iPod, iPod Touch, iPod Nano, and iPod Shuffle lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Referring now to FIG. 2A, a system 200 for incorporating at least one remote window from a remote desktop environment having a first themed graphical display into a local desktop environment having a second themed graphical display includes a first and second virtual channel and a local agent. In brief overview, the first virtual channel 208*a*, which is coupled to a remote desktop environment 204, conveys graphical data associated with a remote window 206. The remote window 206 includes a client area and a window rectangle. The remote desktop environment 204 is displayed according to a first graphical theme. The second virtual channel 208*b*, which is coupled to the remote desktop environment 204, conveys window attribute data associated with the remote window 206. The window attribute data includes screen coordinates for the client area. The local agent 210, which is coupled to the remote desktop environment 204 via the first and second virtual channels 208, directs the formation of a corresponding local window 214 in a local desktop environment 212, which is displayed according to a second graphical theme. The corresponding local window 214 includes a local client area displaying the graphical data conveyed by the first virtual channel 208*a* and displayed at screen coordinates within the local desktop environment 212 in accordance with the window attribute data conveyed by the second virtual channel 208*b*, and has a local window rectangle displayed according to a second graphical theme.

With continued reference to FIG. 2A, and in greater detail, a second machine 102 is connected to a first machine 106. In one embodiment, the second machine 102 is a client 102 as described above in connection with FIGS. 1A-1C. In another embodiment, the first machine 106 is a server 106 as described above in connection with FIGS. 1A-1C. As shown in FIG. 2A, the first machine 106 has an associated display 124, which displays a remote desktop environment 204. It should be noted that the display 124 need not be a video display monitor. For example, in some embodiments, the display 124 may be a bank of video RAM to which applications write the output of graphical procedure calls.

As shown in FIG. 2A, the second machine 102 has an associated display 124'. The display 124' may be used to display one or more components of a graphical user interface, such as windows and pull-down menus. The collection of graphical user interface components displayed to a user by the display 124' is generally referred to as a "desktop." As shown in FIG. 2A, the second machine 102 displays a local desktop environment 212 to a user. In one embodiment, the second machine 102 provides at least a part of the local desktop environment 212. In another embodiment, the second machine 102 displays various desktop components received from other sources, such as from one or more first machines 106. FIG. 2A depicts an embodiment of a system in which the remote desktop environment 204 displays a graphical user interface window 206 and in which the local desktop environment 212 displays a graphical user interface window 214.

The first machine 106 includes a remote agent 202. In some embodiments, each first machine 106 includes one remote agent 202 for each second machine 102 connected to the first machine 106. The second machine 102 executes a local agent 210. In some embodiments, a second machine 102 executes a separate local agent 210 for each first machine 106 to which the second machine 102 is connected. In other embodiments, the client node 10 executes a single local agent 210 that manages connections to multiple first machines 102.

In one embodiment, a first machine 106 and a second machine 102 communicate using a presentation layer protocol, such as the Independent Computing Architecture (ICA) protocol, manufactured by Citrix Systems, Inc. of Fort Lauderdale, Fla., the RDP protocol, manufactured by Microsoft Corp. of Redmond, Wash.; the X11 protocol; or the Virtual Network Computing (VNC) protocol, manufactured by AT&T Laboratories Cambridge. In another embodiment, the first machine 106 and the second machine 102 each execute a version of the WINDOWS operating system. The second machine 102 executes a local agent 210 that may be provided as a dynamically linked library module. The first machine 106 executes a remote agent 202 that may be provided as a separate thread. In some embodiments, the local agent 210 and the remote agent 202 may be presentation layer protocol clients, such as ICA clients, RDP clients, X11 clients, VNC clients, or a combination of any of these.

In one embodiment, the local agent 210 and the remote agent 202 exchange graphical data, i.e., the data actually displayed in each window on the desktop environment 204, 212, via a first virtual channel 208a. Information about window positioning, window size, z-access ordering of window and other such information is communicated between the first machine 106 and a second machine 102 via a second virtual channel 208b. When the first machine 106 and a second machine 102 are actively exchanging information via the second virtual channel 208b, the second machine 102 may be referred to as being in "seamless windowing mode." In some embodiments, the first and second virtual channels 208a, 208b are provided within a single virtual channel 208.

The agents may include transmitters, or processes for transmitting, information to other agents. Information identified and stored by the agent 202, 210 can include window geometry, such as the title bar associated with each window, the location of each window 206, 214 in the desktop environment 204, 212; the size of each window 206, 214; and the z-order positioning of each window 206, 214 in the desktop environments 204, 212. In one embodiment, the information includes data associated with displaying the window 206, 214 according to a graphical theme. In another embodiment, the information includes the location of a portion of each window 206, 214 in the desktop environment 204, 212.

In one embodiment, the desktop environments 204, 212 are displayed according to graphical themes. In another embodiment, the remote desktop environment 204 is displayed according to a first graphical theme and the local desktop environment 212 is displayed according to a second graphical theme. In still another embodiment, a window 206 in the remote desktop environment 204 is displayed according to the first graphical theme. In still even another embodiment, a window 214 in the local desktop environment 212 is displayed according to the second graphical theme.

In some embodiments, a theme refers to a customization of a graphical user interface. In one of these embodiments, the theme provides a unified look and feel for the graphical user interface. In another of these embodiments, the theme includes a customization of window components, such as scroll bars, title bars, buttons, sliders, menus, menu bars, and other user interface elements displayed in a window. In still another of these embodiments, the theme includes a customization of fonts, icons, sounds, wallpaper, screensavers, background patterns, and colors used in the graphical user interface.

In some embodiments, the local agent 210 receives window attribute data associated with a remote window 206. The window attribute data includes data associated with the first graphical theme. In one of these embodiments, the local agent 210 receives an identification of screen coordinates for a client area within the remote window 206. In another of these embodiments, the local agent 210 receives an instruction to display, in a local window 214, the graphical data shown within the identified screen coordinates. In still another of these embodiments, the local agent 210 receives an instruction to direct the formation of a first portion of the local window 214 by the second machine 102 and to display, in a second portion of the local window 214, graphical data provided by the first machine 106. In still even another of these embodiments, the first portion of the local window 214 is the portion of the window that displays a theme and the second portion of the local window 214 is a client area; for example, the first portion may include a title bar and border forming a non-client area and the second portion may include a client area. In yet another of these embodiments, directing the second machine 102 to display the first portion of the local window 214 and using data provided by the first machine 106 to display the second portion of the local window 214— instead of using data provided by the first machine 106 in the entire local window 214—results in the display of remote data within a local window 214 having a graphical theme corresponding to a graphical theme of the local desktop environment 212.

Figure 2B:
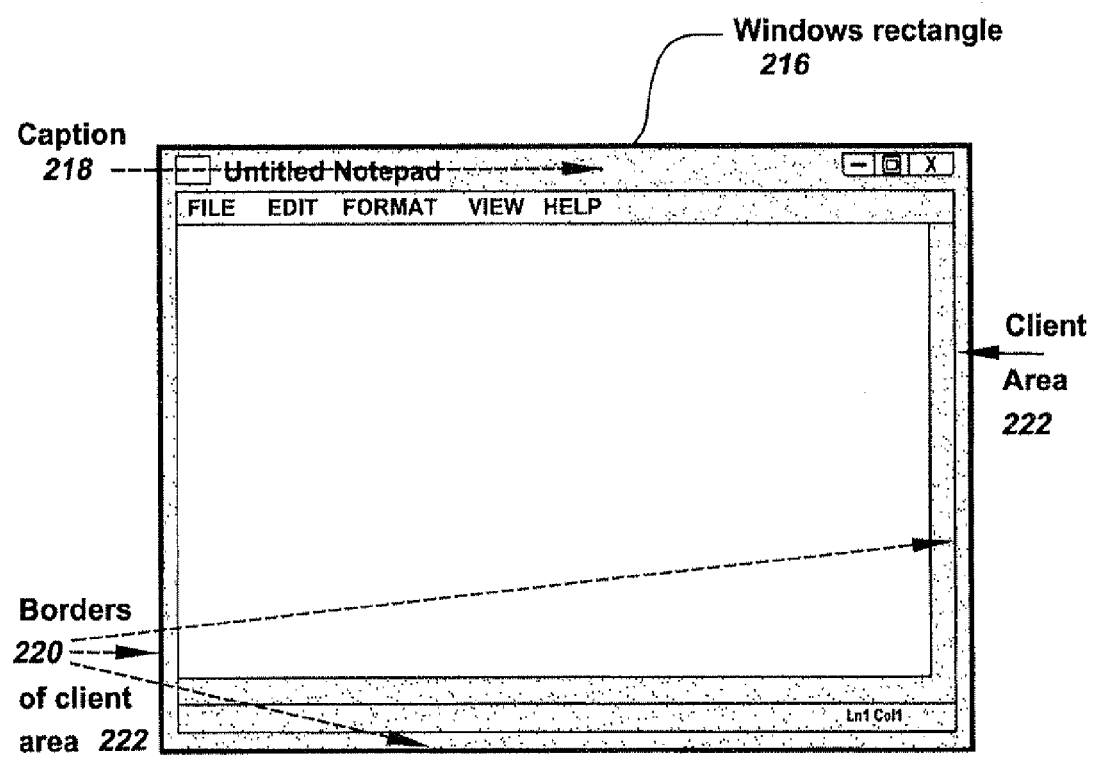
FIG. 2B is a screen shot depicting one embodiment of a window rectangle and a client area in a window displayed by a local desktop environment.

Referring now to FIG. 2B, a screen shot depicts one embodiment of a window 206, 214 in a desktop environment 204, 212. In some embodiments, the window 206, 214 is associated with a window region, which may be a data object defining an area for drawing the window 206, 214. In one of these embodiments, the window region is a window rectangle. In another of these embodiments, the window region is a non-rectangular area. In other embodiments, and as depicted in FIG. 2B, a window 206, 214 is a window rectangle 216 that includes a client area 222 and a non-client area. In one of these embodiments, the non-client area includes a caption 218 (also referred to as the title bar 218) and the borders 220. In another of these embodiments, the non-client area includes a window area typically drawn by a local operating system executing on the second machine 102. In still another of these embodiments, the non-client area includes a window caption, window borders, window menus and window buttons (such as buttons for minimizing, maximizing, or closing windows, or buttons for opening a help window). In yet another of these embodiments, the non-client area includes special effects, such as the glass effect and the extended glass effect provided by certain themes supported by WINDOWS VISTA. As depicted in FIG. 2B, the client area 222 refers to the portion of the window rectangle 216 other than the non-client area, which, in FIG. 2B, is the window region except for the caption 218 and the borders 220. In some embodiments, the client area 222 includes a menu bar. In other embodiments, the client area 222 displays output data generated by a resource. In one of these embodiments, the client area 222 on the local window 214 refers to the portion of the window rectangle 216 that displays output data generated by a resource executing on the first machine 106 and displaying output data in the remote window 206.

In one embodiment, the graphical data conveyed by the first virtual channel is output data generated by a resource executing on the first machine 106 and displayed in the client area 222 of the remote window 206. In another embodiment, an intermediate machine 106' transmits, to the second machine 102, the graphical data conveyed by the first virtual channel, which is output data generated by a resource executing on a first machine 106. For example, the intermediate machine 106' may be a web server providing access to the first machine 106 via a web site or portal or a broker server providing a connection between the first machine 106 and a second machine 102 and passing information through the connection between the two machines. In still another embodiment, the intermediate machine 106' establishes, with the first machine 106, a connection including a first virtual channel 208a and second virtual channel 208b. In still even another embodiment, the intermediate machine 106' executes a local agent 210, which receives graphical data and window attribute data from the first machine 106, which executes a remote agent 202. In yet another embodiment, the intermediate machine 106' executes a remote agent 202', which transmits, to a local agent 210' on the first machine 102, the graphical data and window attribute data received from the first machine 106.

In one embodiment, the remote agent 202 includes a detection process which determines whether to transmit, to the local agent, the screen coordinates for the client area. In another embodiment, the remote agent 202 executes a detection algorithm to determine whether to transmit, to the local agent, the screen coordinates for the client area.

Figure 3A:
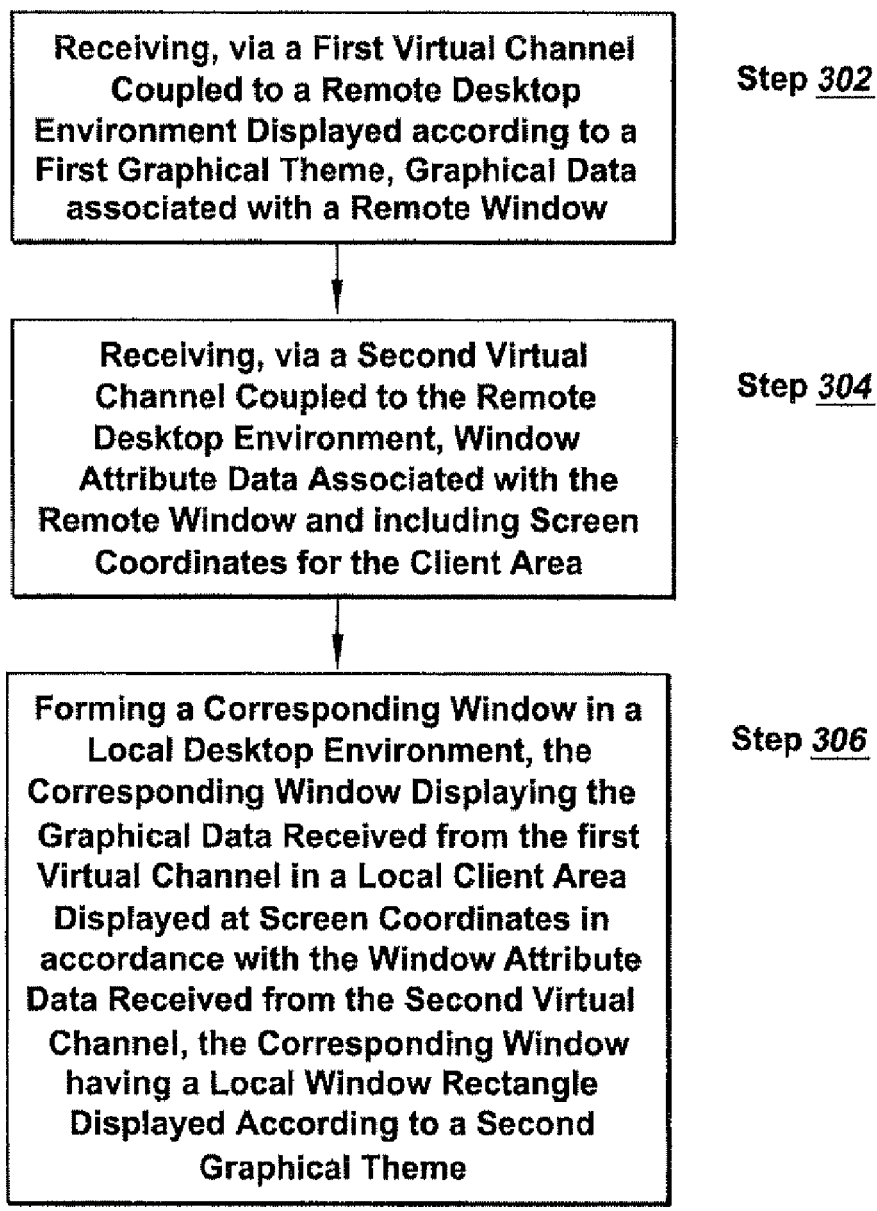
FIG. 3A is a flow diagram depicting one embodiment of the steps taken in a method for incorporating at least one remote window from a remote desktop environment having a first themed graphical display into a local desktop environment having a second themed graphical display.

Referring now to FIG. 3A, a flow diagram depicts one embodiment of the steps taken in a method 300 for incorporating at least one remote window from a remote desktop environment having a first themed graphical display into a local desktop environment having a second themed graphical display. In brief overview, the method includes the step of receiving, via a first virtual channel coupled to a remote desktop environment displayed according to a first graphical theme, graphical data associated with a remote window comprising a client area and a window rectangle (step 302). The method includes the step of receiving, via a second virtual channel coupled to the remote desktop environment, window attribute data associated with the remote window the window attribute data including screen coordinates for the client area (step 304). The method includes the step of forming a corresponding window in a local desktop environment displayed according to a second graphical theme, the corresponding window displaying the graphical data received from the first virtual channel in a local client area, the local client area displayed at screen coordinates in accordance with the window attribute data received from the second virtual channel, the corresponding window having a local window rectangle displayed according to a second graphical theme (step 306).

With continued reference to FIG. 3A, and in greater detail, the method includes the step of receiving, via a first virtual channel coupled to a remote desktop environment displayed according to a first graphical theme, graphical data associated with a remote window comprising a client area and a window rectangle (step 302). In one embodiment, the remote agent 202 transmits, via the first virtual channel, the graphical data. In another embodiment, the local agent 210 receives the graphical data. In still another embodiment, the local agent 210 receives output data generated by an execution of a resource on the first machine 106. In yet another embodiment, the local agent 210 receives, from the first machine 106, output data generated by an execution of a resource on a second machine 106'.

The method 300 includes the step of receiving, via a second virtual channel coupled to the remote desktop environment, window attribute data associated with the remote window the window attribute data including screen coordinates for the client area (step 304). In one embodiment, the remote agent 202 identifies the screen coordinates for the client area. In another embodiment, the remote agent 202 transmits, to the local agent 210, via the second virtual channel, the screen coordinates for the client area.

In some embodiments, the remote agent 202 determines whether to transmit, to the local agent 210, the screen coordinates for the client area 222 of the remote window 206. In one of these embodiments, the remote agent 202 makes a determination as to whether or not to transmit an instruction to display a local graphical theme in a non-client area. In another of these embodiments, the remote agent 202 makes the determination on a per-window basis; for example, the remote agent 202 may transmit the instruction for a parent window and not transmit the instruction for any child windows of the parent window. The child windows, in this example, would be displayed in the local desktop environment according to the graphical theme used on the first machine 106, while the parent window would be displayed in the local desktop environment according to the graphical theme used on the second machine 102. In still another of these embodiments, the parent window is a window having a multiple document interface (MDI) and allows multiple document frame windows—the child windows—to open in a single instance of the application.

In one embodiment, a determination is made as to whether a window 206 is a custom window displaying, in the non-client area, output data generated by a resource executing on the first machine 106 instead of by the operating system on the first machine 106. For example, an application executing on the first machine 106 may generate, for display in a non-client area of a window 206, a customized window component, such as a menu bar, title bar, slider, border, or other component. In another embodiment, the remote agent 202 makes a determination not to transmit the screen coordinates for the client area 222. In still another embodiment, the remote agent 202 makes a determination to transmit an instruction to the local agent 210 to display the graphical data received via the first virtual channel in the window region 216 of the local window 214. In yet another embodiment, instead of displaying only the portion of the graphical data that falls within the screen coordinates, the local client 210 then displays all of the graphical data, including the graphical data generated on the first machine 106 and displaying customized window components.

In one embodiment, the remote agent 202 executes a detection process to determine whether to transmit, to the local agent 210, the screen coordinates for the client area 222 of the remote window 206. In some embodiments, a customized window component is inserted into a caption area 218 of the remote window 206. In one of these embodiments, detection process determines whether a remote window 206 includes customized window component in the caption area 218. In another of these embodiments, the detection process identifies a customized window by scanning a window component, such as a title bar on a remote window 206, for customization. In still another of these embodiments, a customized window 206 will respond with a different message to a scanning message than the message with which a non-customized window would respond. For example, in one embodiment, a non-customized window title bar responds to a WM_NCHIT-TEST message with an HTCAPTION result, while a custom component in the window title bar will respond with an HTBORDER message or a customized response to a WM_N-CHITTEST message. In still even another of these embodiments, a window 206 is scanned prior to the transmission of graphical data or window attribute data to a local agent 210. In yet another of these embodiments, if a scanned window 206 contains a customized window component, a determination is made not to transmit the screen coordinates for the client area 222 of the remote window 206 and the local agent 210 will display, in the window region for the local window 214, all of the graphical data representing output shown in the remote window 206.

Referring now to FIG. 3B, a screen shot depicts an embodiment of a caption 218 including a customized window component. In this embodiment, a detection process has scanned every ten pixels across a center horizontal line of a title bar in a caption 218. Upon identifying the customized button 210, the detection process determines that the remote window 206 containing the caption 218 should be displayed on the second machine 102 with the window attribute data of the remote window 206 instead of according to the graphical theme of the second machine 102.

Referring back to FIG. 3A, and in some embodiments, a determination is made not to transmit the screen coordinates for the client area 222 of the remote window 206 based on an identification of a graphical theme displayed on the first machine 106. In one of these embodiments, a graphical theme on the first machine 106 may support a customized component displayed in the remote window 206. In another of these embodiments, if the graphical theme supports the customized component, the screen coordinates for the client area 222 of the remote window 206 are transmitted to the local agent 210 with an instruction to display, in the client area 222 of the window 214, the graphical data including the customized component. In still another of these embodiments, if the graphical theme does not support the customized component, the screen coordinates for the client area 222 of the remote window 206 are not transmitted to the local agent 210.

In other embodiments, a determination is made not to transmit the screen coordinates for the client area 222 of the remote window 206 based on an identification of a graphical theme displayed on the second machine 102. In one of these embodiments, a graphical theme on the second machine 102 may support a customized component displayed in the remote window 206. In another of these embodiments, if the graphical theme supports the customized component, the screen coordinates for the client area 222 of the remote window 206 are transmitted to the local agent 210 with an instruction to display, in the client area 222 of the window 214, the graphical data including the customized component. In still another of these embodiments, if the graphical theme does not support the customized component, the screen coordinates for the client area 222 of the remote window 206 are not transmitted to the local agent 210.

In still other embodiments, a determination is made not to transmit the screen coordinates for the client area 222 of the remote window 206 based on a determination that the remote window 206 has a non-rectangular window region. In one of these embodiments, a resource provided by the first machine 106 generates a non-rectangular window region; for example, by providing a customized graphical display for a remote window 206.

In one embodiment, the remote agent 202 determines whether to transmit, to the local agent 210, the screen coordinates for the client area 222 of the remote window 206, responsive to an application of a policy to the remote window 206. In one embodiment, an administrator of a first machine 106 determines that a local agent 210 should display a graphical theme or customization applied to a remote window 206 or remote desktop environment 212 should be displayed on the local machine, although this may result in conflicting graphical themes displayed in the local desktop environment 212. In another embodiment, an administrator of a second machine 102 determines that the second machine 102 should not—or cannot—integrate the graphical display of the local desktop environment 212 with the graphical data received from the first machine 106. In still another embodiment, the remote agent 202 accesses a registry setting associated with a window 206 to determine whether to transmit, to the local agent 210, the screen coordinates for the client area 222 of the remote window 206.

The method includes the step of forming a corresponding window in a local desktop environment displayed according to a second graphical theme, the corresponding window displaying the graphical data received from the first virtual channel in a local client area, the local client area displayed at screen coordinates in accordance with the window attribute data received from the second virtual channel, the corresponding window having a local window rectangle displayed according to a second graphical theme (step 306). In some embodiments, the local agent 210 forms the corresponding window upon receiving, via the second virtual channel, information regarding how to display the local window 214. In one of these embodiments, for example, the local agent 210 forms the corresponding window upon receiving an instruction to display graphical data received from the first virtual channel in a client area 222 of the local window 214. In another of these embodiments, the local agent 210 forms the corresponding window upon receiving an instruction to display graphical data received from the first virtual channel in the entire window region of the local window 214, and not just in the client area 222.

In one embodiment, the local agent 210 stores the received graphical data in a buffer, such as a local video buffer. In another embodiment, the local agent 210 directs a window management component executing on the second machine 102 to create a new window 214 in the local desktop environment 212. In still another embodiment, the local agent 210 directs the copying of graphical data from the buffer for display in the client area 222 of the window 214. For example, the local agent 210 may execute a function, or instruct a window management component to execute a function, such as the BitBLT function, for performing a bit-block transfer of data from the buffer for display in the client area 222 of the window 214.

In one embodiment, the local agent 210 implements a change to its associated local desktop environment 212 by directly issuing graphics Application Programming Interface commands that cause the second machine 102 to change the display of its associated desktop 212. In another embodiment, the local agent 210 may issue graphics device interface commands to change its associated desktop 212. In still another embodiment, the local agent 210 issues commands directly to the system, whether implemented in hardware or software, responsible for displaying graphics on the second machine 102.

In some embodiments, the local agent 210 directs the second machine 102 to modify the local desktop environment 212 in response to the messages received from the remote agent 202. In one of these embodiments, the local agent 210 issues commands to the second machine 102 to conform a client area 222 of a local window 214 in the local desktop environment 212 to a client area of a window 206 in the remote desktop environment 204. In another of these embodiments, the local agent 210 directs the formation and modification of windows in the local desktop environment 212 by communicating with a window management component executed by an operating system executing on the second machine 102.

In one embodiment, the local agent 210 transmits, to the first machine 106, window attribute data and graphical data associated with a local window 206' displaying output data generated by a resource provided by the second machine 102. In another embodiment, the local agent 210 transmits screen coordinates for a client area within the local window 206'. In still another embodiment, the first machine 106 displays the graphical data in the client area of a corresponding remote window. In yet another embodiment, the first machine 106 displays a non-client area of the corresponding remote window according to a graphical theme of the remote desktop environment 204.

In other embodiments, the remote agent 202 receives messages from a local agent 210 and directs the first machine 106 to modify the remote desktop environment 204, 212 in response to messages received from the local agent 210. In one of these embodiments, the local agent 210 transmits, to the remote agent 202, window attribute data associated with the client area 222 of the local window 214. In another of these embodiments, the local agent 210 transmits, to the remote agent 202, window attribute data associated with a graphical theme. In still another of these embodiments, the local agent 210 transmits, to the remote agent 202, window attribute data associated with a display of a non-client area component displayed according to a graphical theme. In yet another of these embodiments, the local agent 210 transmits, to the remote agent 202, an identification of a customization that a graphical theme would make to a client area 222 of a local window 214; for example, the local agent 210 may transmit an identification of a customized color, font, or other system metric that a graphical theme would apply to a window component in the client area 222 of the local window 214—such as a menu bar—if the local operating system were displaying the data in the client area 222, instead of the local agent 210 directing the display of graphical data received from the remote agent 202. In still even another of these embodiments, upon receiving the identification, the remote agent 202 applies the customization to the window component in the client area 222 of the remote window 206. For example, the remote agent 202 may receive an identification of a custom font used by the local agent 210, and may apply the font when drawing fonts in the client area 222. In yet another of these embodiments, when subsequently transmitting window application data associated with the remote window 206 to the local agent 210, the remote agent 202 includes window application data associated with the customization for the window component.

In still other embodiments, the remote agent 202 receives messages from a local agent 210 and directs the first machine 106 to transmit, to a resource provided by the first machine 106, an instruction received, from the local agent 210, to the resource. In one of these embodiments, the local agent 210 determines that a user interaction with a window component within a non-client area of the window rectangle 216 triggers a window change. For example, the user interaction may trigger generation of a message to re-size a window, move a window, display a context menu, maximize a window, minimize a window, apply focus to a window, or remove focus from a window. In another of these embodiments, the local agent 210 transmits the generated message to the remote agent 202 for processing. In still another of these embodiments, the remote agent 202 receives, via the second virtual channel, and transmits, to a window management component on the first machine 106, the message. In still even another of these embodiments, the remote agent 202 transmits for processing the message to a resource generating the output data displayed in the remote window 206. The message may include an instruction to initiate execution of the resource. In yet another of these embodiments, the resource generates additional output data for display in the client area of the remote window 206; for example, the resource may generate graphical data for displaying a menu or dialog box within the client area 222 of the remote window 206.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems incorporating at least one remote window from a remote desktop environment having a first themed graphical display into a local desktop environment having a second themed graphical display, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for incorporating at least one remote window from a remote desktop environment having a first themed graphical display into a local desktop environment having a second themed graphical display, the system comprising:
   a first virtual channel coupled to a remote desktop environment and conveying graphical data associated with a remote window, the remote window comprising: (i) a client area within the remote window displaying output data, and (ii) a non-client area within the remote window displaying graphical user interface elements generated according to a first graphical theme of the remote desktop environment;
   a second virtual channel coupled to the remote desktop environment and conveying screen coordinates for the client area; and
   a processor of a second machine executing a local agent coupled to the remote desktop environment via the first and second virtual channels, the local agent directing the formation of a corresponding local window in a local desktop environment displayed according to a second graphical theme of the second machine, the corresponding local window comprising: (i) a local client area within the corresponding window bounded by the received screen coordinates, and (ii) a local non-client area within the corresponding window displaying graphical user interface elements generated according to the second graphical theme, the local client area displaying a portion of the graphical data conveyed by the first virtual channel bounded by the received screen coordinates.

2. The system of claim 1 further comprising a first machine generating the remote desktop environment and providing, to a user of the second machine, access to the remote desktop environment.

3. The system of claim 2, wherein the local agent executes on the second machine displaying the local desktop environment to a user.

4. The system of claim 1 further comprising a remote agent transmitting, to a local machine, an instruction for directing the formation of the corresponding local window.

5. The system of claim 1 further comprising a remote agent including a detection process determining whether to transmit, to the local agent, the screen coordinates for the client area, responsive to identifying that the non-client area within the remote window includes a customized window component.

6. The system of claim 1, wherein the local agent further comprises a transmitter for sending, to a remote agent, window attribute data associated with the client area of the corresponding window.

7. The system of claim 1, wherein the screen coordinates for the client area identify an area in a window rectangle that excludes a title bar.

8. The system of claim 1, wherein the screen coordinates for the client area identify an area in a window rectangle that excludes a border of the window rectangle.

9. A method for incorporating at least one remote window from a remote desktop environment into a local desktop environment, the method comprising:
   (a) receiving, via a first virtual channel coupled to a remote desktop environment, graphical data associated with a remote window, the remote window comprising: (i) a client area within the remote window displaying output data, and (ii) a non-client area within the remote window displaying graphical user interface elements generated according to a first graphical theme of the remote desktop environment;

(b) receiving, via a second virtual channel coupled to the remote desktop environment, screen coordinates for the client area within the remote window;

(c) forming, by a local agent, a corresponding window in a local desktop environment displayed according to a second graphical theme of the local desktop environment, the corresponding window comprising: (i) a local client area within the corresponding window bounded by the received screen coordinates, and (ii) a local non-client area within the corresponding window displaying graphical user interface elements generated according to the second graphical theme; and (d) displaying a portion of the graphical data received from the first virtual channel bounded by the received screen coordinates in the local client area.

10. The method of claim 9, wherein step (b) comprises receiving, from a remote agent via the second virtual channel, an instruction for directing the formation of the corresponding local window.

11. The method of claim 9 further comprising determining, by a remote agent, whether to transmit, to the local agent, the screen coordinates for the client area, responsive to identifying that the non-client area within the remote window includes a customized window component.

12. The method of claim 9 further comprising executing, by a remote agent, a detection process to determine whether to transmit, to the local agent, the screen coordinates for the client area, responsive to identifying that the non-client area within the remote window includes a customized window component.

13. The method of claim 9 further comprising determining, by a remote agent, whether to transmit, to the local agent, the screen coordinates for the client area, responsive to an application of a policy to the remote window, identifying that the non-client area within the remote window includes a customized window component.

14. The method of claim 9 further comprising transmitting, by the local agent, to a remote agent, window attribute data associated with the client area of the corresponding window.

15. The method of claim 14 further comprising transmitting, by the remote agent, to a resource generating output data displayed in the remote window, an instruction to modify the remote window, responsive to the received window attribute data.

16. The method of claim 9 further comprising receiving, by a remote agent, an instruction for processing by a resource generating output data displayed in the remote window.

17. An article of manufacture having computer readable instructions thereon that when executed cause a processor to incorporate at least one remote window from a remote desktop environment into a local desktop environment, the computer readable instructions comprising:

instructions to receive, via a first virtual channel coupled to a remote desktop environment, graphical data associated with a remote window, the remote window comprising: (i) a client area within the remote window displaying output data, and (ii) a non-client area within the remote window displaying graphical user interface elements generated according to a first graphical theme of the remote desktop environment;

instructions to receive, via a second virtual channel coupled to the remote desktop environment, screen coordinates for the client area within the remote window;

instructions to form, by a local agent, a corresponding window in a local desktop environment displayed according to a second graphical theme of the local desktop environment, the corresponding window comprising: (i) a local client area within the corresponding window bounded by the received screen coordinates, and (ii) a local non-client area within the corresponding window displaying graphical user interface elements generated according to the second graphical theme; and instructions for displaying a portion of the graphical data received from the first virtual channel bounded by the received screen coordinates in the local client area.

18. The article of manufacture of claim 17 further comprising instructions to receive, from a remote agent via the second virtual channel, an instruction for directing the formation of the corresponding local window.

19. The article of manufacture of claim 17 further comprising instructions to determine, by a remote agent, whether to transmit, to the local agent, the screen coordinates for the client area, responsive to identifying that the non-client area within the remote window includes a customized window component.

20. The article of manufacture of claim 17 further comprising instructions to execute, by a remote agent, a detection process to determine whether to transmit, to the local agent, the screen coordinates for the client area, responsive to identifying that the non-client area within the remote window includes a customized window component.

21. The article of manufacture of claim 17 further comprising instructions to determine, by a remote agent, whether to transmit, to the local agent, the screen coordinates for the client area, responsive to an application of a policy to the remote window, identifying that the non-client area within the remote window includes a customized window component.

22. The article of manufacture of claim 17 further comprising instructions to transmit, by the local agent, to a remote agent, window attribute data associated with the client area of the corresponding window.

23. The article of manufacture of claim 22 further comprising instructions to transmit, by the remote agent, to a resource generating output data displayed in the remote window, an instruction to modify the remote window, responsive to the received window attribute data.

24. The article of manufacture of claim 17 further comprising instructions to receive, by a remote agent, an instruction for processing by a resource generating output data displayed in the remote window.

* * * * *